US009176919B2

(12) United States Patent
Carney et al.

(10) Patent No.: US 9,176,919 B2
(45) Date of Patent: Nov. 3, 2015

(54) PROCESS CONTROLLER HAVING MULTI-CHANNEL SERIAL COMMUNICATIONS LINK

(75) Inventors: Michael D. Carney, Havertown, PA (US); Francis J. Crowe, Pottstown, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/569,309

(22) Filed: Aug. 8, 2012

(65) Prior Publication Data

US 2013/0332633 A1    Dec. 12, 2013

Related U.S. Application Data

(60) Provisional application No. 61/656,368, filed on Jun. 6, 2012.

(51) Int. Cl.
*G06F 13/42* (2006.01)
*G06F 13/38* (2006.01)

(52) U.S. Cl.
CPC .......... *G06F 13/4291* (2013.01); *G06F 13/385* (2013.01)

(58) Field of Classification Search
CPC combination set(s) only.
See application file for complete search history.

(56) References Cited

U.S. PATENT DOCUMENTS

| 4,490,788 | A   | * | 12/1984 | Rasmussen ...................... 710/21 |
|-----------|-----|---|---------|----------------------------------------|
| 4,845,722 | A   | * | 7/1989  | Kent et al. ...................... 370/388 |
| 5,187,780 | A   | * | 2/1993  | Clark et al. ................... 710/106 |
| 5,307,463 | A   |   | 4/1994  | Hyatt et al.                           |
| 5,887,165 | A   |   | 3/1999  | Martel et al.                          |
| 6,317,804 | B1  | * | 11/2001 | Levy et al. ..................... 710/305 |
| 7,378,873 | B1  |   | 5/2008  | Tang et al.                            |
| 8,441,947 | B2  | * | 5/2013  | Pratt et al. ...................... 370/252 |
| 2011/0018819 | A1 | * | 1/2011 | Yeh et al. ....................... 345/173 |

OTHER PUBLICATIONS

Theerapong Fongjun, et al., "Automatic Multi Channel Serial I/O Interface Using FPGA", National Electronics and Computer Technology Center, Thailand, SICE Annual Conference, Sep. 13-18, 2011, Waseda University, Tokyo, Japan, pp. 864-867.

* cited by examiner

*Primary Examiner* — Ilwoo Park
(74) *Attorney, Agent, or Firm* — Jeffer & Associates, P.A.

(57) ABSTRACT

A process controller includes a central processing unit (CPU) and a multi-channel serial communication interface including a plurality of serial communication engines in parallel to one another coupled to the CPU. The multi-channel serial communication interface provides a plurality of independent serial communication channels between the CPU and a plurality of IO modules. The plurality of independent communication channels enable the CPU to simultaneously receive signals at any time from any combination of the plurality of IO modules.

14 Claims, 5 Drawing Sheets

PROCESS CONTROLLER HAVING MULTI-CHANNEL SERIAL COMMUNICATIONS LINK

CROSS REFERENCE TO RELATED APPLICATIONS

This application claims the benefit of Provisional Application Ser. No. 61/656,368 entitled "PROCESS CONTROLLER HAVING MULTI-CHANNEL SERIAL COMMUNICATIONS LINK" filed Jun. 6, 2012, which is herein incorporated by reference in its entirety.

FIELD

Disclosed embodiments relate to communication interfaces that enable communications between a process control system and a plurality of field devices being controlled, and hybrid process controllers including both process controllers and communication interfaces.

BACKGROUND

Figure 1:
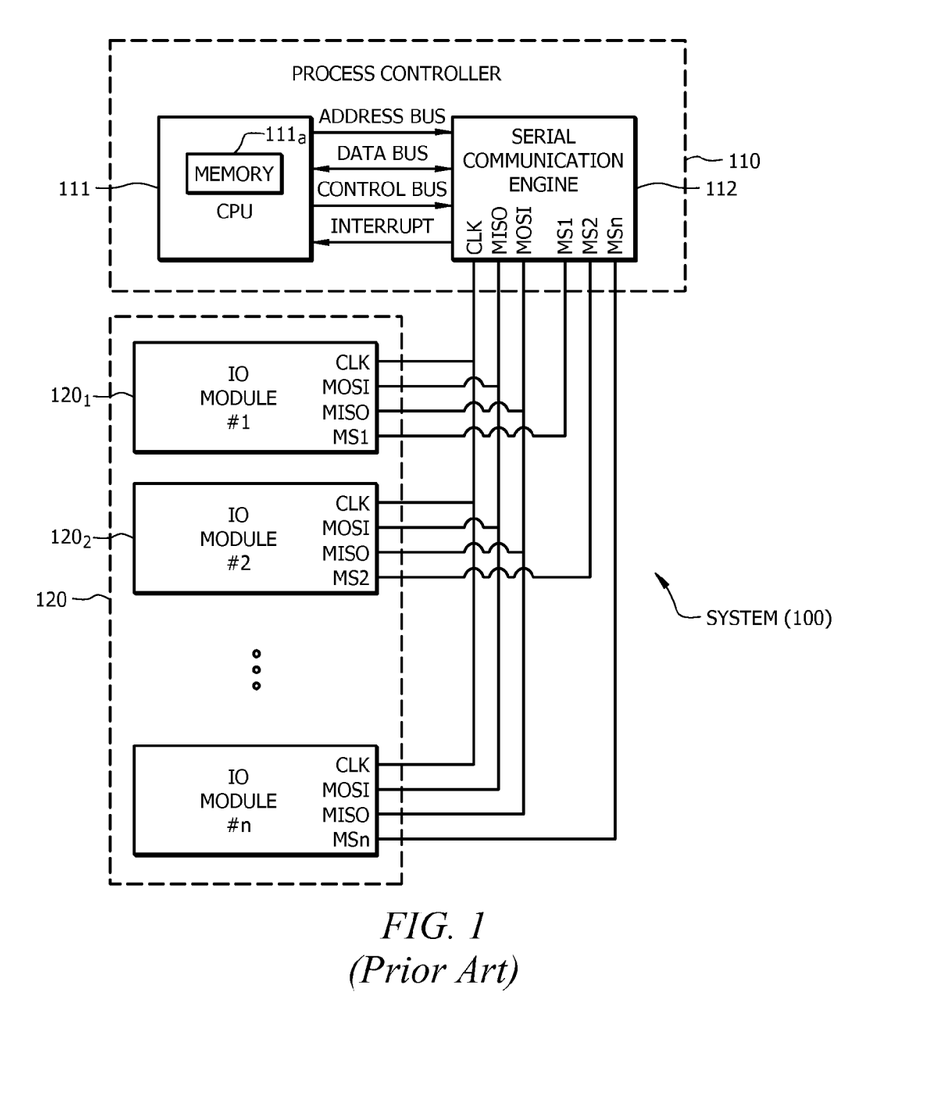
FIG. 1 is a block schematic diagram of a conventional control system comprising a process controller interfaced to a plurality of IO modules.

FIG. 1 is a block schematic diagram of a conventional process control system 100 comprising a process controller 110 interfaced to a plurality of input/output (IO) modules 120 shown as IO modules $120_1$, $120_2$, ... $120n$. Although not shown, the IO modules 120 each generally connect on the side opposite the process controller 110 to a plurality of IO field devices to allow control of the process being controlled by the process controller 110. As known in the art, IO field devices can comprise gauges, valves, sensors at an industrial plant that runs a physical (industrial or manufacturing) process which generates a tangible product. Process controller 110 includes a central processing unit (CPU)/central computer 111 having internal memory 111a (e.g., register memory), and a serial communication engine 112. A Serial Peripheral Interface (SPI) bus provides a synchronous serial data link that operates in full duplex mode between the process controller 110 and the IO modules $120_1$, $120_2$, ... $120_n$. Each of the IO modules $120_1$, $120_2$, ... $120_n$ has an SPI port.

SPI specifies four logic signals. These signals are (i) CLK (serial clock) output from controller/master (controller); (ii) MOSI; SIMO: controller/master output, IO module/slave input (output from controller/master); (iii) MISO; SOMI controller/master input, IO module/slave output (output from slave); and (iv) separate/independent IO module/slave select signals (active low, output from controller/master) shown as MS1, MS2, MSn.

The IO modules $120_1$, $120_2$, ... $120_n$ are connected in a daisy chain configuration where the outputs (MISO) of the respective IO modules $120_1$, $120_2$, ... $120_n$ can be seen to all be connected together. Respective IO modules 120 communicate in master/slave mode where the process controller 110 acting as the master device forms the messages to be sent to the slave device in its memory 111a to initiate data frames to form a multi-frame message.

The multi-frame message is then sent to a single selected slave IO module $120_1$, $120_2$, ... $120_n$, at a time enabled by the individual slave select (chip select) lines MS1, MS2, MSn provided by serial communication engine 112. In addition, the message received by the process controller 110 from any of the IO modules 120 ... 120n is placed into the memory 111a of the process controller 110. The serial data transfer rate for control system 100 is mainly set by the data transfer between the IO modules 120 based on the data transfer rate of the media (e.g., copper traces on a backplane or other types of wired connections) and the duration of the worst case of the IO modules' $120_1$, $120_2$, ... $120_n$ data transfer time. Data transfers between known process control systems, such as control system 100 in common use at plants, are typically de-rated as the number of IO modules $120_1$, $120_2$, ... $120_n$ grows based upon number and types of IO modules. This data transfer limitation increases both the complexity and cost of the control system 100.

Moreover, serial communications between daisy-chained IO modules 120 inherently has a single point of failure, being the media. This aspect limits the overall availability of the system 100 lowering its mean time between failures and can also increase the mean time to repair. Moreover, data from the IO modules $120_1$, $120_2$, ... $120_n$ to the process controller 110 cannot be streamed data (back-to-back) since there is some data processing time required for the microprocessor or microcontroller at the CPU 111 to perform data processing after the data is received by the serial communication engine 112. This processing time further limits the amount of data that can be communicated in a selected window of time.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments solve the system data rate transfer problem described above for known daisy chain Serial Peripheral Interface (SPI) control system arrangements by providing a plurality of individual serial communication channels that allows each of the IO modules to communicate with the process controller independent of the actions of the other IO modules. The multiple independent serial channels thus effectively remove the loading of each IO module's time on the media. The serial communication channels can be SPI-compatible channels.

Disclosed embodiments include process controllers including a central processing unit (CPU) and a multi-channel serial communication interface comprising a plurality of serial communication engines coupled to the CPU. The multi-channel serial communication interface provides a plurality of independent serial communication channels between the CPU and a plurality of IO modules. The plurality of independent communication channels enable the CPU to simultaneously receive signals at any time from any combination of the plurality of IO modules, which are coupled to I/O field devices, allowing real-time control of the process associated with the I/O field devices. Disclosed process controllers also allow the CPU to simultaneously transmit to any combination of the plurality of IO modules with different messages.

Multi-channel serial communication interface can comprise a multi-channel serial peripheral interface (M-SPI). Disclosed process controllers can be used for both synchronous and asynchronous systems.

DETAILED DESCRIPTION

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Figure 2A:
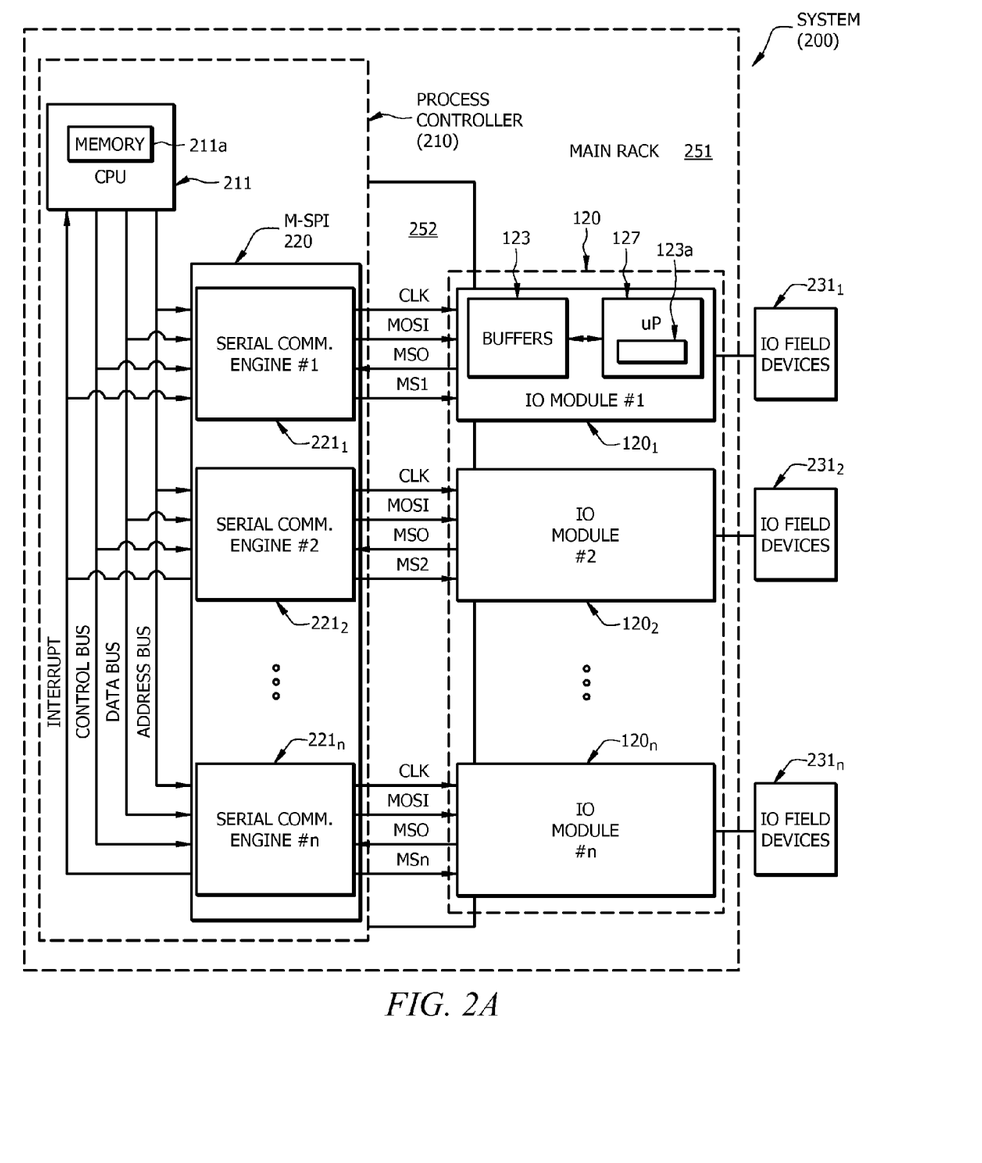
FIG. 2A is block schematic diagram of a control system comprising an example controller interfaced to a plurality of IO modules having a plurality of independent serial communication channels between the CPU and the plurality of IO modules, according to an example embodiment.

FIG. 2A is block schematic diagram of a process control system 200 comprising an example process controller 210 interfaced to a plurality IO field devices $231_1$, $231_2$ ... $231_n$ ... via a plurality of IO modules $120_1$, $120_2$, ... $120_n$, ("collectively IO modules 120"), according to an example embodiment. The process controller 210 and IO modules 120 are shown on a main rack 251 having a multi-slot backplane 252 (e.g., 4, 8 or 12 slot backplane). Although not shown, the process control system 200 can utilize hubs/repeaters to also connect the process controller 210 to one or more remotely located racks.

Figure 2B:
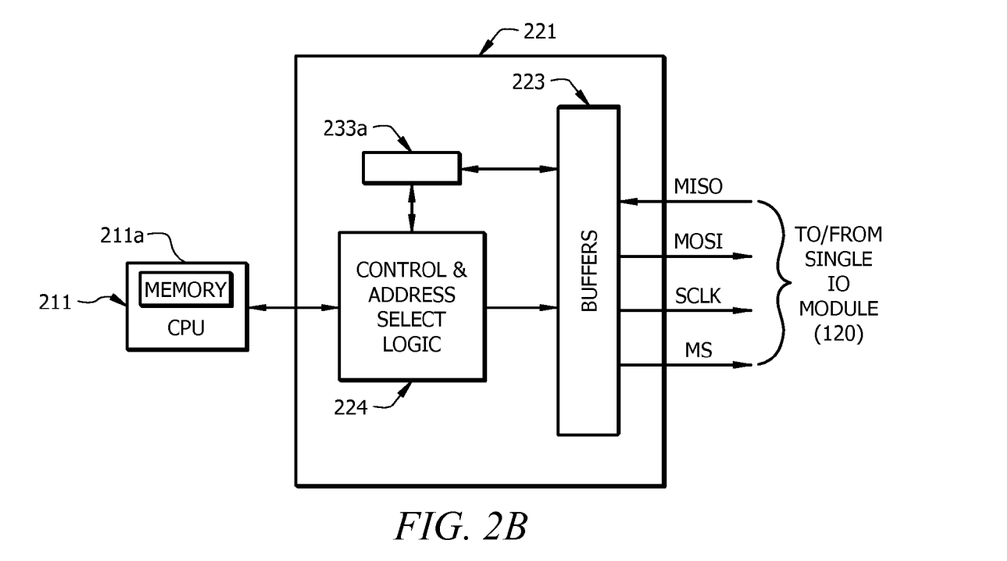
FIG. 2B is a block diagram of an example serial communication engine having buffers and control and address select logic.

The process controller 210 comprises a CPU 211 having internal memory 211a (e.g., register memory) and a multi-channel serial communication interface shown as a M-SPI 220 comprising a plurality of serial communication engines electrically in parallel to one another including serial communication engines $221_1$, $221_2$, ... $221_n$ which are coupled to the CPU 211 in FIG. 2A. A block diagram of an example serial communication engine 221 is shown in FIG. 2B which comprises buffers 223 which can be implemented by software stored in memory 233a to provide the control and address select logic 224 shown, as well as signal level shifting Alternatively, buffers 223 can be realized in hardware to provide control and address select logic as well as signal level shifting. Although the communications are shown in FIG. 2A as being SPI having a 4-wire bus, disclosed embodiments more generally apply to serial communication systems.

The M-SPI 220 in FIG. 2A can be seen to provide a plurality of independent SPI channels including separate (independent) communication paths between the CPU 211 and each of the serial communication engines $221_1$, $221_2$, $221_n$, and independent communication paths between each of the serial communication engines $221_1$, $221_2$, $221_n$ and the respective IO modules $120_1$, $120_2$, ... $120_n$ provided by the separate MISO, MOSI, CLK and MS paths shown. The independent SPI channels having separate MISO MOSI, CLK and MS paths enable the CPU 211 to simultaneously receive signals at any time from one or all (any combination) of the plurality of IO modules $120_1$, $120_2$, ... $120_n$ and thus from any of the IO devices field $231_1$, $231_2$ ... $231_n$. I/O field devices $231_1$, $231_2$ ... $231_n$ generally comprise devices such as gauges, actuators, valves, sensors when the process being controlled is at a plant which runs a physical (industrial or manufacturing) process that generates a tangible product. In one application, process control system 200 is a distributed control system (DCS) where the elements of the system are distributed throughout the system with each component sub-system controlled by one or more distributed (remote) process controllers.

As described above, MS1, MS2, MSN is used in system 200 to allow multiple IO modules 120 to simultaneously communicate with the process controller 210. In contrast, in the known process control system 100 shown in FIG. 1 the process controller 110 communicates to the IO modules as required (either sequentially or in some other order), where only one of the plurality of IO modules 120 can be addressed (spoken to/listened too) at any given time. The MS line in FIG. 1 designates which of the IO modules 120 is being accessed in a one-to-one relationship similar to a discrete conversation between a speaker and the audience. In this known arrangement, the speaker (process controller) would not be able to understand one member in the audience if more than one member of the audience (e.g., the IO modules) is already replying/speaking. In contrast, disclosed process control systems, such as process control systems 200 shown in FIG. 2A, removes the audience confusion process control system 100 by effectively placing each of the IO modules 120 (each of the audience members) in different "rooms" in effect allowing multiple conversations to be carried on at the same time so that one IO module does not interfere with other IO modules, even if more than one audience member is replying/speaking to the process controller at the same time.

The plurality of serial communication engines $221_1$, $221_2$, $221_n$, can include one or more Field Programmable Gate Arrays (FPGAs). A single FPGA can implement the plurality of serial communication engines 221. Alternatively, in another embodiment the plurality of serial communication engines 221 include one or more programmable logic devices (PLDs) or application specific integrated circuits (ASICs). The buffers 223 shown in FIG. 2B for the serial communication engine 221 provide independent transmit and receive message buffering to support each of the plurality of independent serial communication channels shown in FIG. 2A associated with each of the IO modules 120. As noted above, buffering includes protection and level shifting of the signals. In one embodiment the memory 223a can comprise random access memory (RAM), such as a static RAM (SRAM).

CPU 211 generally comprises a microprocessor or microcontroller having internally implemented memory 211a. The IO modules 120 also include buffers 123 including memory 123a and a microprocessor or microcontroller shown as a microprocessor (µP) 127. Buffers 123 can be hardware devices and the memory 123a can be internally implemented on the µP 127. SPI communications are used to pass commands as well as data and status information back and forth to accomplish coordinated real-time control of the process being controlled.

In contrast, known process control system 100 described above has the process controller 110 communications with each of the IO modules 120 on a scheduled basis, one after the other. In this known control system 100 the communication between the process controller 110 and the IO modules 120 cannot be streamed (data back-to-back) since the CPU 111 must take time to process the signals as they are being sent or received. This limits the amount of data that can be transferred in a selected window of time; significantly reducing the overall timing of system 100 since communications is restricted to a single IO module at any given time.

The M-SPI approach enabled by disclosed process controllers such as process controller 210 provides independent communication paths which enable both simultaneous messages to be transmitted from a plurality of IO modules 120 to the CPU 211, as well as the CPU 211 to simultaneously transmit different messages to any combination of the plurality of IO modules 120. The disclosed M-SPI approach also enhances the robustness of the system since independent communication paths for each of the I/O modules $120_1$, $120_2$, ... $120_n$, to the process controller 120 means a severe failure of any of the IO modules $120_1$, $120_2$, ... $120_n$, will not take down the entire control system 200 as it will to control system 100 due to the failed channel driving the shared single communication channel regardless of whether it has the proper permissions.

Benefits of disclosed controllers 210 include allowing the controller to communicate simultaneously with two or more of its associated I/O modules $120_1$, $120_2$, ... $120_n$. This is a significant benefit since it allows for the truest synchronization between the IO channels themselves and a faster scan rate as compared to control system 100. Synchronization also provides a less noisy controller action caused by delays between measurements from the IO field devices $231_1$, $231_2$ ... $231_n$ and output control actions provided by controller 210. Each I/O modules $120_1$, $120_2$, ... $120_n$ is also allowed to have their own unique delays between bytes and/or messages transmitted to controller 210 which allows the control system to have a major improvement that can be sustained throughout its life cycle. Moreover, new IO modules 120 can be added to the system architecture (e.g., when a plant adds machinery to increase product output) with minimal or no impact to the overall communication cycle time.

Disclosed controllers 210 also eliminate accumulated delays caused by sequential messaging that is inherent to known SPI-based control systems, such as known control system 100. The message structure of control system 100 can have delays between bytes in the range from about 25 µs to 150 µs. These delays are accumulative across the entire messaging cycle and for each I/O module. As described above, the M-SPI approach disclosed herein eliminates such delays by limiting the message cycle time to the time for the single worst case I/O module in the system.

Other benefits of disclosed embodiments include use of fewer interrupts. Using a conventional SPI communication scheme, such as the conventional SPI implemented by control system 100, each byte or character transfer in a message from any of the IO modules 120 to the process controller 110 can be handled by an interrupt routine applied to each byte/character per message/frame. Disclosed M-SPI reduces the interrupt to a single interrupt per IO module 120 message greatly enhancing the system availability and performance.

Figure 3:
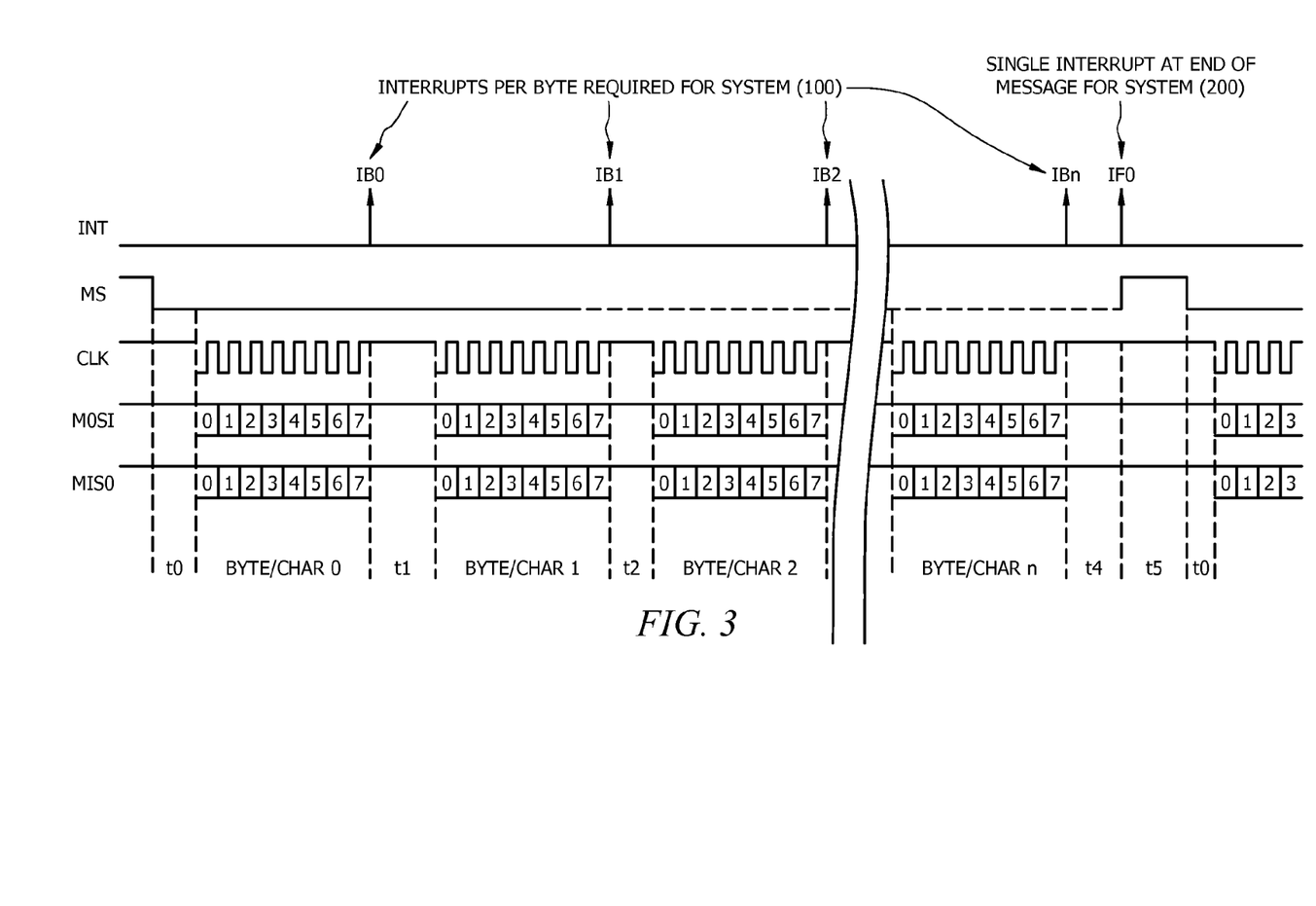
FIG. 3 is a timing diagram that shows transmission of a multi-byte message from an IO module to a process controller showing the interrupts required with each byte of a message for a conventional control system communications (IB0 to IBn for interrupts for byte 0 through byte n), and the single interrupt per message (IF0 for frame/message 0) that can be used for disclosed control system communications.

FIG. 3 is a timing diagram that shows transmission of a multi-byte message from an IO module 120 to a process controller CPU 111 including the interrupts required with each byte/character for conventional control system 100 communications (IB0 to IBn for interrupts for byte 0 through byte n) and the single interrupt (IF) per frame/message (IF0 for frame/message 0) that can be used for communications using disclosed control system 200. The IBs (IB0 to IBn for byte 0 through interrupt for byte n) required for conventional control system 100 to process each byte/character of the frame/message transmitted by the IO module 120 and received by the process controller 110 imposes a significant interrupt burden. The M-SPI method provided by disclosed control system 200 offloads this interrupt burden by recognizing the end-of-frame/message by sending a single IF interrupt shown as IF0 per frame/message positioned at the end of the frame/message, instead of an IB after each byte/character of the message. Since the typical message includes about 40 bytes, disclosed M-SPI significantly reduces the interrupt burden, such as by 97.5% for a 40 byte message.

As noted above, the fault tolerance of disclosed control systems, such as control system 200 is also vastly improved. A single point of failure on the SPI or an I/O module on disclosed control systems, such as control system 200, will not prevent the higher level system from functioning properly as it will for control system 100.

Disclosed controllers 210 having independent channels also do not lock the user into any one particular data protocol. This feature supports multiple data protocols on the independent channels, such as the industrial protocol MODBUS (a serial communications protocol first published by Modicon in 1979 for use with its programmable logic controllers (PLCs) which make use of delays between messages to frame the message. Disclosed embodiments can make MODBUS or other industrial protocols more efficient. Such protocols generally each have multiple programmable delays to customize bytes and messages gaps based on the I/O module's individual requirements. The messages can also be set to transmit identical messages/request such as repeatedly at a desired rate further offloading the CPU 211 from loading never changing request.

The time delay $t_5$ after the single interrupt IF0 shown in the timing diagram of FIG. 3 as IF0 can serve at least two purposes. One purpose is delaying a new message from being communicated, similar to a pause employed between sentences of verbal communication. A second purpose is for enabling it to repeat the message one after another. This capability further offloads the process controller from reassembling messages that are typically repeated under normal operation, such as would be required to constantly monitor a temperature sensing device in a furnace, where not only the temperature but the rate of change and the deviation of the temperature are important to the control of the process. Although generally described for a single repeated message, disclosed embodiments can be used for a repeated group of common messages.

To configure a disclosed programmable process controller 210 in a process control system during controller configuration the user via programming, such as via Very High Speed Integrated Circuit Hardware Description Language (VHDL) language, can specify the quantity and type of function blocks needed for the particular application. Disclosed process controllers 210 can include timing mechanisms to allow user settable delay times between the serial characters being transmitted.

Multiple time delays may be employed to ensure that data protocol better utilizes the available bandwidth and the processing capability of the process controller. $T_0$ in FIG. 3 provides a delay from MS line being driven to the start of the data transmission so that the slave device selected from the plurality of IO modules 120 has time to change its mode of operation and put the first byte into its transmit register. $T_1$ makes the provision for the processors to process the data transmitted and received. $T_2$ provides the same functionality as $T_1$ but enables finer tuning so if the protocol and process can operate faster or in some cases slower once the protocol is dedicated to the communication task it may be adjusted as required. This is similar to addressing someone in a crowd by name, prior to starting the conversation; therefore once a particular IO module is addressed, which takes more processing time, the remaining bytes may use a smaller delay since the IO module is in a more efficient communication mode to receive the information since less processing time is required. $T_4$ allows time for the processor to clean up the message processing and prevent the other of the slave IO modules 120 to communicate.

Figure 4:
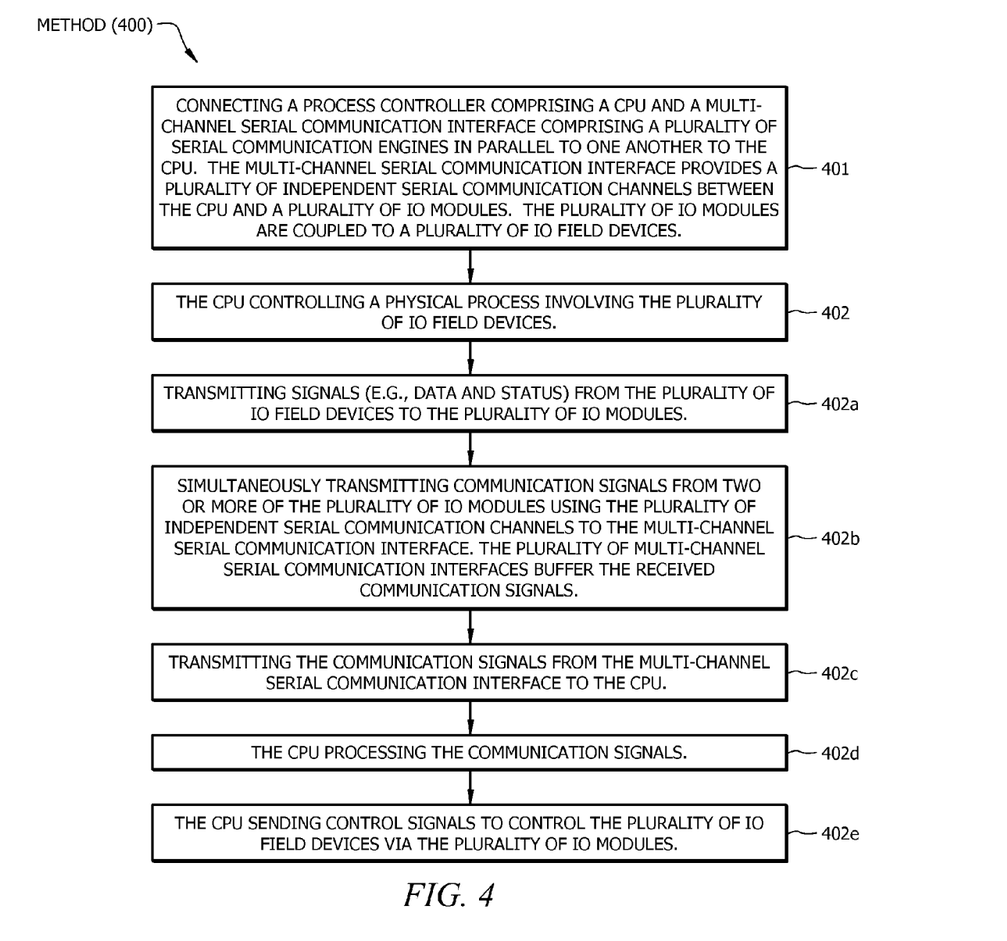
FIG. 4 is a flow chart that shows steps in a method of communicating between a control system and a plurality of IO modules using a plurality of independent serial communication channels between the CPU and a plurality of IO modules, according to an example embodiment.

FIG. 4 is a flow chart that shows steps in a method 400 of process control of a physical process involving a plurality of IO field devices, such a process run by an industrial plant. Step 401 comprises communicably connecting a process controller comprising a CPU and a multi-channel serial communication interface comprising a plurality of serial communication engines in parallel to one another to the CPU, wherein the multi-channel serial communication interface provides a plurality of independent serial communication channels between the CPU and a plurality of IO modules, and wherein the plurality of IO modules are coupled to a plurality of IO field devices. Step 402 comprises the CPU controlling the physical process involving the plurality of IO field devices.

Step 402*a* comprises transmitting signals (e.g., data and status) from the plurality of IO field devices to the plurality of IO modules. Step 402*b* comprises simultaneously transmitting communication signals from two or more of the plurality of IO modules using the plurality of independent serial communication channels to the multi-channel serial communication interface, wherein the multi-channel serial communication interface buffers the communication signals. Step 402*c* comprises transmitting the communication signals from the multi-channel serial communication interface to the CPU. Step 402*d* comprises the CPU processing the communication signals. Step 402*e* comprises the CPU sending control signals to control the plurality of IO field devices via the plurality of IO modules.

Disclosed controllers 210 having independent serial communication channels may generally be applied to benefit any serial/sequential, synchronous or asynchronous communication system. Examples are provided in two different application spaces. One-to-one communication systems may take advantage of both the time delays and reduction in interrupt overhead processing such as those that need uninterrupted processing time to complete its assigned task, for example the continuous updating of graphical interfaces or positioning types of servo devices. One-to-many communication systems may also take advantage of additional robustness of the separate (individual) communication paths to insure a single point of failure does not take down (render inoperable) the entire modular system. For example medical equipment that monitors multiple sensors on a patient. High speed coordination of a parallel sensing and control system where sequential operation introduces time errors due to the inherent communication delays between the modules required to make the measurements. The delays result in noise or inaccuracies of the subsequent control algorithm such as a those found in real-time filtering applications and high accuracy Proportional, Integral, Deviation known as PID control functions.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The Disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a physical computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

We claim:

1. A process controller, comprising:
   a plurality of IO modules which each include a serial peripheral interface (SPI) port for communicating with a central processing unit (CPU) which controls a physical process that generates a tangible product, a memory and a microprocessor or microcontroller and an interface for communicating with field devices including receiving signals transmitted by said field devices and sending control signals to said field devices for controlling said field devices;
   a multi-channel serial communication interface comprising a plurality of serial communication engines in parallel to one another between said plurality of IO modules and said CPU providing a plurality of independent serial communication channels (serial communication channels) that are dedicated for respective ones of said plurality of IO modules;
   wherein said multi-channel serial communication interface is coupled to said CPU by a bus providing a plurality of separate (independent) communication paths;
   wherein said bus enables said CPU to simultaneously communicate with any combination including with all of said plurality of IO modules using their respective one of said SPI port acting as a communications endpoint with respect to said CPU.

2. The process controller of claim 1, wherein said multi-channel serial communication interface comprises a multi-channel serial peripheral interface (M-SPI) and wherein serial communication channels comprise serial peripheral interface (SPI) channels.

3. The process controller of claim 1, wherein said plurality of serial communication engines comprises at least one Field Programmable Gate Array (FPGA).

4. The process controller of claim 1, wherein said multi-channel serial communication interface comprises a plurality of independent transmit and receive message buffers that include memory for each of said serial communication channels.

5. The process controller of claim 4, wherein said memory comprises random access memory (RAM).

6. The process controller of claim 1, wherein said plurality of serial communication engines comprise at least one programmable logic device (PLD).

7. A method of process control, comprising:
   connecting a process controller comprising a plurality of IO modules which each include a serial peripheral interface (SPI) port for communicating with a central processing unit (CPU), a memory and a microprocessor or microcontroller, and an interface for communicating with field devices including receiving signals transmitted by said field devices and sending control signals to said field devices for controlling said field devices and a multi-channel serial communication interface comprising a plurality of serial communication engines in parallel to one another between said plurality of IO modules and said CPU providing a plurality of independent serial communication channels (serial communication channels) that are dedicated for respective ones of said plurality of IO modules,
   wherein said multi-channel serial communication interface is coupled to said CPU by a bus providing a plurality of separate (independent) communication paths; wherein said bus enables said CPU to simultaneously communicate with any combination including with all of said plurality of IO modules using their respective one of said SPI port acting as a communications endpoint with respect to said CPU, and wherein said plurality of IO modules are coupled to a plurality of field devices,
   said CPU controlling a physical process that generates a tangible product involving said plurality of field devices including:
      sending said control signals to control said plurality of field devices via said plurality of IO modules and receiving said signals transmitted by said field devices via said plurality of IO modules.

8. The method of claim 7, wherein said multi-channel serial communication interface comprises a multi-channel serial peripheral interface (M-SPI) and wherein said serial communication channels comprise serial peripheral interface (SPI) channels.

9. The method of claim 7, wherein at least a first IO module and a second IO module of said plurality of IO modules are active at a given time, and wherein said first IO module and said second IO module have different delays between bytes and/or messages they transmit to said CPU.

10. The method of claim 7, wherein said serial communication channels simultaneously use two or more different data protocols.

11. The method of claim 7, wherein said plurality of serial communication engines comprises at least one Field Programmable Gate Array (FPGA).

12. The method of claim 7, wherein said multi-channel serial communication interface comprises a plurality of independent transmit and receive message buffers that include memory for each of said serial communication channels.

13. The method of claim 7, wherein interrupt processing used between said CPU and said plurality of IO modules to switch to said CPU to start communicates with another of said plurality of IO modules consists of a single interrupt at and an end of each message.

14. The method of claim 13, further comprising a time delay after said single interrupt.

* * * * *